United States Patent
Wang (10) Patent No.: US 9,622,016 B2
(45) Date of Patent: Apr. 11, 2017

(54) INVISIBLEMASK: A TANGIBLE MECHANISM TO ENHANCE MOBILE DEVICE SMARTNESS

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 37 days.

(21) Appl. No.: 14/702,718

(22) Filed: May 2, 2015

(65) Prior Publication Data

US 2016/0323692 A1  Nov. 3, 2016

(51) Int. Cl.
*H04W 4/00* (2009.01)
*H04M 1/725* (2006.01)

(52) U.S. Cl.
CPC ....... *H04W 4/003* (2013.01); *H04M 1/72522* (2013.01); *H04M 1/72566* (2013.01); *H04M 1/72569* (2013.01); *H04M 1/72572* (2013.01); *H04M 1/72583* (2013.01)

(58) Field of Classification Search
CPC ............ H04W 4/003; H04M 1/72522; H04M 1/72572; H04M 1/72566; H04M 1/72583; H04M 1/72569
See application file for complete search history.

(56) References Cited

U.S. PATENT DOCUMENTS

| | | | | |
|---|---|---|---|---|
| 2004/0054539 | A1* | 3/2004 | Simpson | G10L 15/30 704/270.1 |
| 2014/0122563 | A1* | 5/2014 | Singh | H04L 67/34 709/203 |
| 2014/0171116 | A1* | 6/2014 | LaMarca | H04W 4/02 455/456.3 |
| 2016/0094946 | A1* | 3/2016 | Keithley | H04W 4/023 455/456.3 |

* cited by examiner

*Primary Examiner* — Brandon Miller
(74) *Attorney, Agent, or Firm* — Anova Law Group, PLLC (57) ABSTRACT

An inter-app switching method on a mobile device is provided. The method includes receiving at least one input associated with mobile app usage from a user and determining whether a pre-defined trigger is enabled based on the at least one received input. The method also includes performing routine user operations on the mobile device when the pre-defined trigger is disabled. Further, the method includes discovering a current user intent by utilizing at least one user interaction, recommending at least one mobile app recommendation and access point including at least an entrance to a function and a type of the function (FUNC) to the user, receiving a selection by the user from the at least one recommended FUNC, and directly switching from a current app page to another app page without returning to any home screen on the mobile device when the pre-defined trigger is enabled.

12 Claims, 5 Drawing Sheets

INVISIBLEMASK: A TANGIBLE MECHANISM TO ENHANCE MOBILE DEVICE SMARTNESS

FIELD OF THE INVENTION

The present invention generally relates to the field of computer technologies and, more particularly, to inter-app switching systems and methods.

BACKGROUND

Nowadays, mobile apps have become major user interaction units on mobile devices, such as phones, tablets, smartwatches or other wearable devices, and people spend more and more time on using the mobile apps. The "mobile application" (also called "app") is a computer program designed to run on smartphones, tablet computers and other mobile devices. However, the number of mobile apps in usage for an ordinary user has been stable at around 26 apps/month during the recent years. Compared to the total number of mobile apps (around 2.5 Million mobile apps in total as of mid-2014), the number of 26 mobile apps is really a very tiny percentage (0.001%), which indicates that people may not have fully utilized the intelligence of the mobile app services available due to the lack of app discovery capability. On the other hand, even inside the mobile app, sometimes it takes user tremendous efforts to discover a function page that addresses a user's immediate needs.

To improve mobile device user experiences, according to the present disclosure, the user can achieve his/her immediate needs in a very efficient manner by transition among app pages directly. If a system can capture the user's current intent accurately, the system can lead the user into an opened app page that can exactly solve the user's immediate needs. However, because different users may be in different states at different moments, the user's accurate intent is often difficult to capture by the system. For example, a user has a very strong immediate intent to use an app but does not have a clue on how to approach, either because the user does not know which app to use, or how to talk to an iPhone with Siri, or does not know how a phone can help to address his/her intent. For another example, a user does not have a very strong immediate intent to use an app when the user is surfing the Internet on a mobile phone, but something the user is viewing can trigger some thoughts and can result in a need.

The disclosed systems and methods are directed to solve one or more problems set forth above and other problems.

BRIEF SUMMARY OF THE DISCLOSURE

One aspect of the present disclosure includes an inter-app switching method on a mobile device. The method includes receiving at least one input associated with mobile app usage from a user and determining whether a pre-defined trigger is enabled based on the at least one received input. The method also includes performing routine user operations on the mobile device when the pre-defined trigger is disabled. Further, the method includes discovering a current user intent by utilizing at least one user interaction, recommending at least one mobile app recommendation and access point including at least an entrance to a function and a type of the function (FUNC) to the user, receiving a selection by the user from the at least one recommended FUNC, and directly switching from a current app page to another app page without returning to any home screen on the mobile device when the pre-defined trigger is enabled.

Another aspect of the present disclosure includes an inter-app switching system. The system includes a user interaction handler configured to receive at least one input associated with mobile app usage from a user and determine whether a pre-defined trigger is enabled based on the at least one received input. The system also includes the pre-defined trigger configured to bring a plurality of visible objects on a mobile device screen to be accessible for user selection when the pre-defined trigger is enabled, wherein the pre-defined trigger is one of a specific gesture on the mobile device that is not normally used by mobile apps and a specific button that is added to the mobile device. Further, a routine operation handling module configured to, when the pre-defined trigger is disabled, perform routine user operations on the mobile device and an interactive user intent discovery module configured to, when the pre-defined trigger is enabled, discover a current user intent by utilizing at least one user interaction and receive a selection by the user from the plurality of visible objects shown on the mobile device screen.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

When a user wants to switch from one mobile app to another mobile app, the transition between mobile apps is slower than the direct transition between two mobile app pages if a bridge between two pages exists. In an automatic process for direct transition between two or more mobile app pages or between other types of apps or functions, instead of returning back to an app launching page or other launching screen after completing a first app, the user can directly access a second app from the first app.

A mobile app recommendation and access point may be used to achieve such direct transition without significant user interactions or involvement. The mobile app recommendation and access point may include an entrance to the function on the mobile device or web, a type of the function, and other relevant information, such as location, status, and nature of the function, etc. The function may include a native mobile app, a web app, and a customized function as a cloud application programming interface (API). A native mobile app may refer to a mobile device application that is coded in a specific programming language for a particular operating system. The native mobile app is installed directly on a mobile device. A web app may refer to a website that is tailored to function via a web browser on a mobile device. The entrance to function and the type of the entrance may include a variety of configurations. For example, an access point may include a link to a web app page, a link to a customized function, a link or shortcut to an installed native app page, a link to a page of a compressed version of a native app, a link to the action of native app download and installation, and a link to an app guideline page that suggests the user to open an alternative app, etc.

For the sake of convenience, such mobile app recommendation and access point may be represented using the term FUNC. Thus, each FUNC is a function-level operation flow, which is associated with a function or service that satisfies a user's specific need. For a same need, different users may use different FUNCs in different mobile apps (for example, a user may use Facebook to share a picture, and another user may use WeChat for the same purpose) according to the user's habits or preferences. Because the FUNC provides an entrance to a native app, a web app, or a customized function, the FUNC may be used to make transition from one mobile app to the other mobile app. With a FUNC, a functional flow of user's action can be built up more smoothly without using the app-level operations. The app-level operations refer to certain operations that are performed among multiple mobile apps or web services by frequently using the home page, and thus more user interactions (screen touches or key presses) may be required. For example, a typical pattern of the app-level operations is that the user can find one mobile app to solve a current need, and then go back to the home page and start another mobile app to solve the next task, thus this loop can go on and on.

On the other hand, a FUNC-level operation (i.e., certain operations of direct transition between two mobile app pages or other similar application (or app) pages are performed by the entrance to the function(s) on the mobile device or web) can cross multiple mobile apps or web apps/services.

Data transferring among FUNCs is also supported to improve the user experience. That is, some information used in the previous FUNC can be arranged in place for the current FUNC usage, so that the user does not need to input the information again for the current FUNC. If a user's daily activities correspond to a list of needs and solutions, the corresponding list of FUNCs can be used to replace the solutions that can be resolved via the mobile devices, and the list of sequential FUNCs represents the least user interactions with the mobile devices to accomplish these needs, also called the least-touch mobile application (or app).

To further improve the user experience, the concept of InvisibleMask is introduced in the present disclosure. InvisibleMask is a mechanism (e.g., an application program) built into a mobile device without changing the normal behavior of the mobile device, and the InvisibleMask in general is not visible to the user if the InvisibleMask is not activated. Once the InvisibleMask is activated by certain triggering factors, the visible objects on a mobile device screen become tangible and the system can lead the user to interact with the visible objects to achieve the goal in his/her mind.

Figure 1:
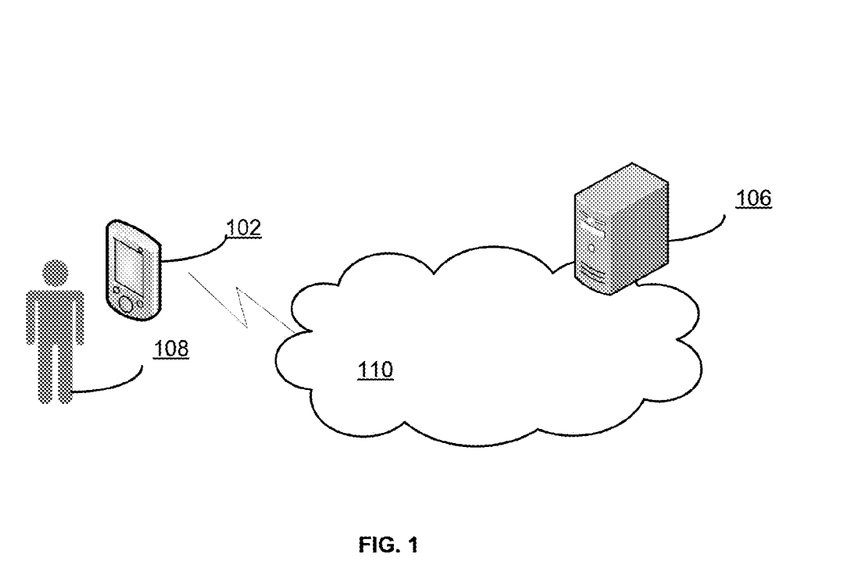
FIG. 1 illustrates an exemplary environment incorporating certain embodiments of the present invention.

The InvisibleMask is built on top of the FUNC foundation. The InvisibleMask is tangible when a pre-defined trigger is enabled by a user to activate the InvisibleMask. The trigger can be a specific gesture on the mobile device (e.g., double click with 2 fingers) that is not normally used by mobile applications or apps, or a specific button that is added to the mobile device. After the InvisibleMask is activated, all visible objects on the mobile device screen become accessible (or clickable) for user interaction. For example, when a user does not know what to do or which app is used, and InvisibleMask becomes a handy assistant once the user activates the InvisibleMask. FIG. 1 illustrates an exemplary environment 100 incorporating certain embodiments of the present invention.

As shown in FIG. 1, environment 100 may include a mobile device 102, a network device 106, a user 108 and a network 110. Optionally, environment 100 may include an input device (not shown). The input device may include any simple input/output device, such as a keyboard, a touch pen stylus, and a voice-activated input device, etc.

Mobile device 102 may include any appropriate type of mobile device, such as a tablet or mobile computer, a smart phone, etc. Mobile device 102 may run apps for the user to use. The Mobile device 102 may obtain such apps from any appropriate sources, such as from a local storage device, from a wired or wireless network device of a service provider, or from the Internet. Further, the apps may include any appropriate type of app, such as entertainment app, news app, games app, education app, travel app, social networking app, productivity app, and utilities app, etc.

Further, the network device 106 may include any appropriate type of computing or consumer electronic device to facilitate the communication, data storage, and data processing for mobile device 102. For example, when environment 100 uses an online service, a network device from a service provider may provide apps to mobile device 102, i.e., an app server. Mobile device 102 and network device 106 may communicate with each other through communication network 110, such as a cable network, a phone network, and/or a satellite network, etc. Although one mobile device 102 and one network device/server 106 are shown in FIG. 1, any number of mobile devices and/or network devices may be included.

Figure 2:
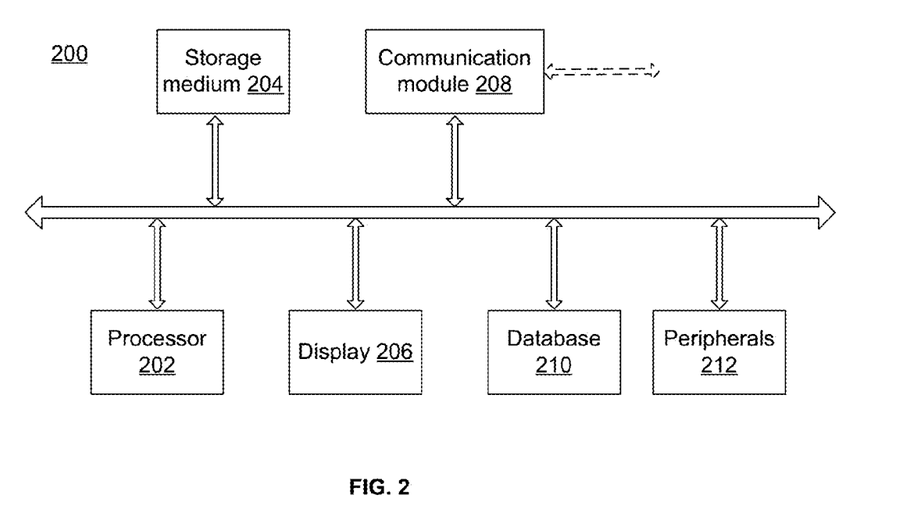
FIG. 2 illustrates an exemplary computing system consistent with the disclosed embodiments.

Mobile device 102, and/or network device 106 may be implemented on any appropriate computing circuitry platform. FIG. 2 shows a block diagram of an exemplary computing system 200 capable of implementing mobile device 102, and/or network device 106.

As shown in FIG. 2, computing system 200 may include a processor 202, a storage medium 204, a display device 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Peripherals 212 may include various sensors and other I/O devices, such as a keypad, a keyboard, and a mouse, and communication module 208 may include certain network interface devices for establishing connections through communication networks. Various devices may include various peripherals 212. For example, the mobile device may include cameras, microphones, and other sensors, etc. Further, database 210 may include one or more databases for storing certain data and for performing certain operations on the stored data, such as database searching.

Figure 3:
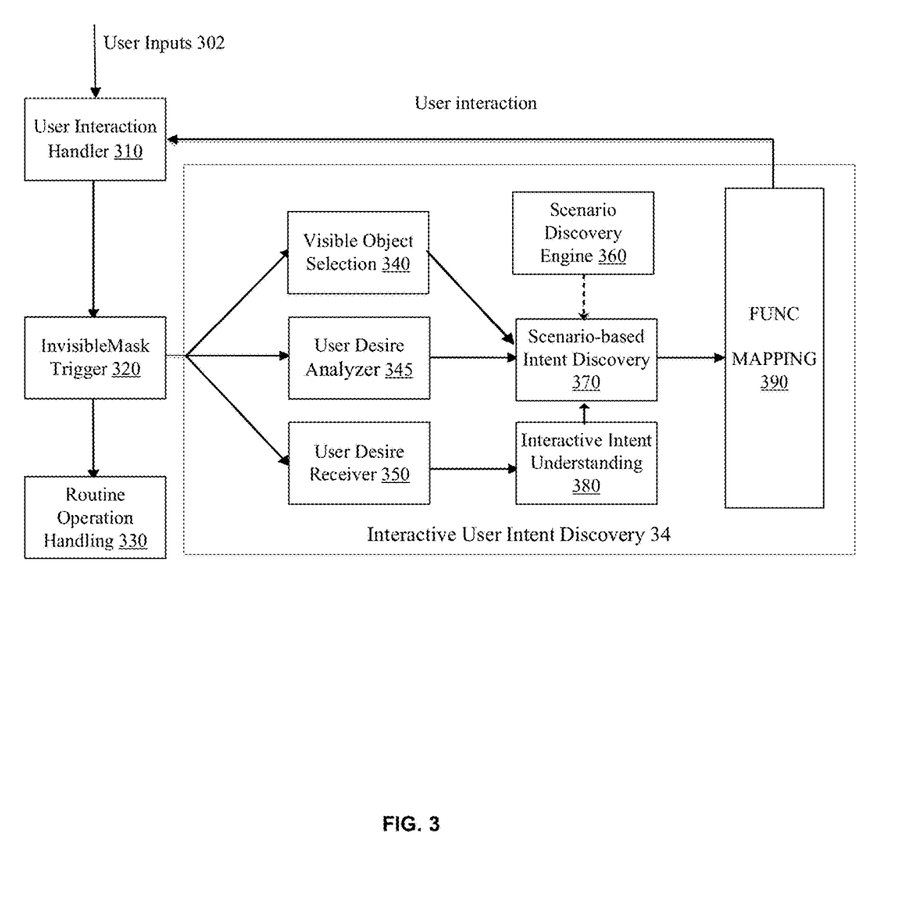
FIG. 3 illustrates a block diagram of an exemplary inter-app switching system consistent with the disclosed embodiments.

In operation, the mobile device 102, the network device 106, and/or the input device may perform an automatic inter-app switching process between two or more mobile app pages or between other types of apps or functions using InvisibleMask. The InvisibleMask enables efficient inter-app switching following an interactive user intent discovery. If the user's next immediate needs can be predicted by learning user behavior and preferences and one or more mobile app pages can be prepared to satisfy his/her needs, then the user experience can be desired. FIG. 3 illustrates a block diagram of an exemplary inter-app switching system consistent with the disclosed embodiments.

As shown in FIG. 3, the system 300 may include a user interaction handler 310, an InvisibleMask trigger 320, a routine operation handling module 330, and an interactive user intent discovery module 34. The interactive user intent discovery module 34 may further include a visible object selection module 340, a user desire analyzer 345, a user desire receiver 350, a scenario discovery engine 360, a scenario-based intent discovery module 370, an interactive intent understanding module 380, and a FUNC mapping module 390. Certain components may be omitted and other components may be added. Various components may be implemented in hardware, software, or a combination of hardware and software. For example, these modules and units may be implemented on computer system 200.

The user interaction handler 310 may be configured to receive a plurality of inputs 302 associated with mobile app usage from a user, and dispatch routine user operations on a mobile device and a special gesture to turn on the InvisibleMask. After receiving the user's inputs 302, the user interaction handler 310 may perform certain input processing, such as selecting an app to install or removing an app from the interface, etc. Further, the user interaction handler 310 may determine whether the user inputs change any of the current recommendation settings and/or contents and cause the InvisibleMask trigger 320 to turn on the InvisibleMask.

Based on the received inputs, the user interaction handler 310 determines whether the pre-defined InvisibleMask trigger 320 is enabled, where the InvisibleMask is a tangible mechanism to bring all visible objects on the mobile device screen to be accessible for user selection.

The InvisibleMask trigger 320 may be configured to turn on or turn off the InvisibleMask. The InvisibleMask trigger 320 can be a specific gesture on a mobile device (e.g., double click with 2 fingers) that is not normally used by mobile apps, or a specific button that is added to the mobile device.

When the InvisibleMask is turned on, all visible objects on the screen become accessible (or clickable) for user interaction. That is, once the InvisibleMask is activated by certain triggering factors, the visible objects on the mobile device screen become tangible and the system leads the user to interact with the visible objects to achieve his/her goal. For example, if the user does not have a very strong immediate intent to use an app when the user is surfing the Internet on a mobile phone, but the contents viewed by the user can trigger some thoughts, a smart guide map shows up to guide the user to approach a solution for his/her immediate intent.

The user may often turn on the InvisibleMask trigger for the following reasons: (1) the user has seen an object on the screen that is interested to him/her; (2) the user has a strong intent in mind that can tell the mobile device to assist; (3) the user does not have any strong desire but wants to see what the mobile device can suggest him/her to watch out.

Thus, the system may try to understand the user's intention by communicating with the user and by learning the current scenario via data collected from various sensors (e.g., location data from location/position sensors), and then a number of FUNCs are recommended from the system to resolve the current needs of the user. Once the user selects a FUNC and brings the FUNC up, or the user returns to a previous page before triggering the InvisibleMask, the system can automatically turn off the InvisibleMask. Thus, the InvisibleMask is only to help the user with a package of solution for current immediate needs of the user. Whether the user chooses the solution or not, the InvisibleMask may be turned off and the operations on the mobile device may be performed as a normal mobile device without installing the InvisibleMask system. Next time when the user has needs, the special gesture or other triggers may be used to turn on the InvisibleMask again.

The routine operation handling module 330 may be configured to perform routine user operations on the mobile device when the InvisibleMask trigger is not turned on. That is, the routine operation handling module 330 can perform exactly the same as other mobile devices without installing the InvisibleMask system when the InvisibleMask is not turned on.

The interactive user intent discovery module 34 may be configured to, when the pre-defined InvisibleMask trigger 320 is enabled, discover a current user intent by utilizing user interaction and lead the user into an opened app page for meeting the current user intent.

The visible object selection module 340 may be configured to enable the user to select (by a certain specified gesture on the screen) an image, a block of text, a phone number, or an icon representing human identity or other specific meanings for further processing. In a normal mobile device, this selection function may not apply for all visible objects and it depends on the design and implementation of the mobile apps in usage. However, in this system, when the pre-defined InvisibleMask trigger 320 is enabled, all visible objects become selectable for further operations as long as the user makes moves with a selection gesture.

The visible object selection module 340 may be also configured to convert the selected object to a representative text as the user's current intent for further processing.

The user desire analyzer 345 may be configured to monitor the user's interactions and detect the user's mood to evaluate the degree of the user desire. That is, the user desire analyzer 345 may determine whether the user's desire is strong.

The user desire receiver 350 may be configured to receive the user's desire directly via voice, text or other inputting methods in the mobile device, and transform content of the received user desire into a text format. For example, voice signals may be transformed into a text format using a speech-to-text technology. The output of the user desire receiver 350 is the desire of the user expressed in the text format.

The scenario discovery engine 360 may be configured to detect the knowledge (e.g., time, location, events, and user's preferences) for the current scenario and dynamically update the knowledge base for other modules (e.g., interactive intent understanding module 380) to use.

The scenario discovery engine 360 may determine a main page for the current scenario utilizing the sensing capability of the mobile device. For example, the scenario can be at home, at work, ready to dine, on the car, and so on. The sensors include location/position sensors, connection/interaction sensors, motion/touch sensors, media sensors, software sensors, and so on. Most of the elements of discovery are obtained from the sensors.

Further, the scenario discovery engine 360 may further include a user behavior and preference analyzer (not shown in FIG. 3). But some of the elements of discovery may be derived from a learning process by a user behavior and preference analyzer. The user behavior and preference analyzer may be configured to closely monitor the user's interactions with the mobile device and analyze user access patterns of the user's mobile device usage. An average user interaction quantity may be used as a user experience factor to evaluate the system. The average user interaction quantity refers to the number of touches on the mobile device or gestures for completing the same task in a certain time period (e.g., 10 minutes). For the same task, the lower the user interaction quantity is, the better the user experience of the mobile device is.

The user behavior and preference analyzer may monitor the user's usage history within a certain time period and identify a main interest of the user according to the user's using history, such as the user's selection of app categories. Specifically, the user behavior and preference analyzer may monitor the user's interactions, and evaluate the user's behavior pattern. For example, a user may fluently select an app via a button on the mobile device.

The user behavior and preference analyzer may analyze the user's mobile device usage from various aspects (e.g., a frequency using a mobile app) in order to determine the relationships between the user's behavior and his/her preferences. For example, the user behavior and preference analyzer may determine the current preference of the user by the click pace of the user interaction and/or the mobile app selected for using.

The user behavior and preference analyzer may also determine the icon (or button) usage pattern or the user's habit in utilizing the icons (or buttons) on the mobile device. For example, some users may click the icons (or buttons) in a fluent manner, while others may only explore limited icons (or buttons) on the mobile device. The men, women, kids, elders may have different taste on the app selection.

The user behavior and preference analyzer may determine a usage model of the app on the mobile device, for example, typical using hours, frequency, and so on. Different people may have different icon (or button) usage patterns, which include the frequency of certain icon (or button) usage, the frequency of certain icon (or button) transferring, and so on. For example, the user behavior and preference analyzer may maintain probability tables for the usage patterns and use the probability tables in identifying the user and the user's behavior model.

More specifically, the user behavior is analyzed from many angles, such as certain menu/key/button usage, and certain gesture usage, in order to capture internal connections between the user's behavior and his/her preferences. To understand the user access patterns in the system, the distribution of user accesses can be characterized as a function of time. For example, the user behavior and preference analyzer may examine the distribution first across hours of the day, and then across days of the week. The user behavior and preference analyzer plays a significant role in guiding the FUNC recommendation.

When analyzing an app category type, the user preference analysis targets to characterize the user's long-term mobile device usage history based on various scenarios and associated context background. Typically, in a cluster algorithm, a FUNC can be labeled as a vector <Xi>, where Xi belongs to an infinite list like {0, 1, . . . , G} when representing a business/toolkit category type, such as travel, finance, social type function.

The user behavior and preference analyzer may represent the user preference using a mixture of K Gaussian distributions (K=1 for the case Xi is a binary value), where each Gaussian is weighted according to the frequency with which it belongs to the specific category. Thus, the probability that the user prefers Xt at time t may be estimated as:

$$P(X_t) = \sum_{i=1}^{K} w_{i,t} \frac{1}{\sqrt{2\pi}\,\sigma_i} e^{-\frac{1}{2}(X_t-\mu_{i,t})^T \sum^{-1}(X_t-\mu_{i,t})}, \quad (1)$$

where t represents time information; K represents the number of categories related to the current mobile app; $w_{i,t}$ is a normalized weight; and $\mu_i$ and $\sigma_i$ are the mean and the standard deviation of the i-th distribution, respectively.

The most influential distribution in the mixture form needs to be determined and may be used to determine whether the current user has a specific preference or not. The Gaussian distributions with the most supporting evidence and the least variance may indicate the likeliness of the distribution. The user behavior and preference analyzer may sort the K distributions based on the value of w/σ and maintain an ordered list. Thus, the most likely distributions may be kept on top and the less probable state-transient distributions may be kept at the bottom.

The most likely distribution models for a FUNC category may be obtained by:

$$B = \arg\min_b(\Sigma_{j=1}^b w_j > T) \quad (2)$$

where a threshold T is a fraction of the total weight given to a specific category.

The knowledge discovery is very important for the scenario that the user's intent is not accurately obtained. In such a case, the system may use the knowledge obtained from the scenario discovery engine 360 to make recommendations for the next-step FUNCs to be presented to the user.

The interactive intent understanding module 380 may be configured to complete the process of converting an input text to a combination of key words or key objects that are understandable to the system to reflect the user's current intent, with the assistance of user's interaction.

The scenario-based intent discovery module 370 may be configured to combine the user's intent with the scenario-based knowledge to obtain refined knowledge. For example, a user's intent is to look for a restaurant, when a location sensor of a mobile device detects the location of a current scenario, the current intent may be changed to "find a restaurant and indicate a distance from the current location".

The FUNC mapping module 390 may be configured to make FUNC prediction or recommendations when the scenario-based user intent knowledge is available.

Specifically, multiple recommended FUNCs for user selection are listed on the screen of the smart phone. For example, the list may include an email page, a contact page, a bank account login page, a weather information page, a medical dictionary page, and so on. The number of recommended FUNCs may be preset by the user.

It should be noted that no matter the user selects a visible object displayed on the screen of the mobile device or inputs a text sentence, the user's desire may be mapped into a combination of terms that can represent his/her desire, and the FUNC mapping module 390 may map the terms into the FUNC recommendations. For example, a sentence "Find a restaurant of seafood for me" can be represented by "Restaurant"+"Seafood".

Further, the FUNC mapping module 390 may include a FUNC recommender (not shown in FIG. 3), and a next-step FUNC predictor (not shown in FIG. 3).

The FUNC recommender may be configured to make an initial FUNC recommendation to the user based on the current state of the mobile device and the user's current intent. The initial FUNC recommendation may be determined or selected by the FUNC recommender to be available for recommendation. The next-step FUNC predictor may be configured to predict which FUNC the user wants to enter at the next step. That is, the next-step FUNC predictor may automatically predict the next function that the user may need all the time.

Figure 4:
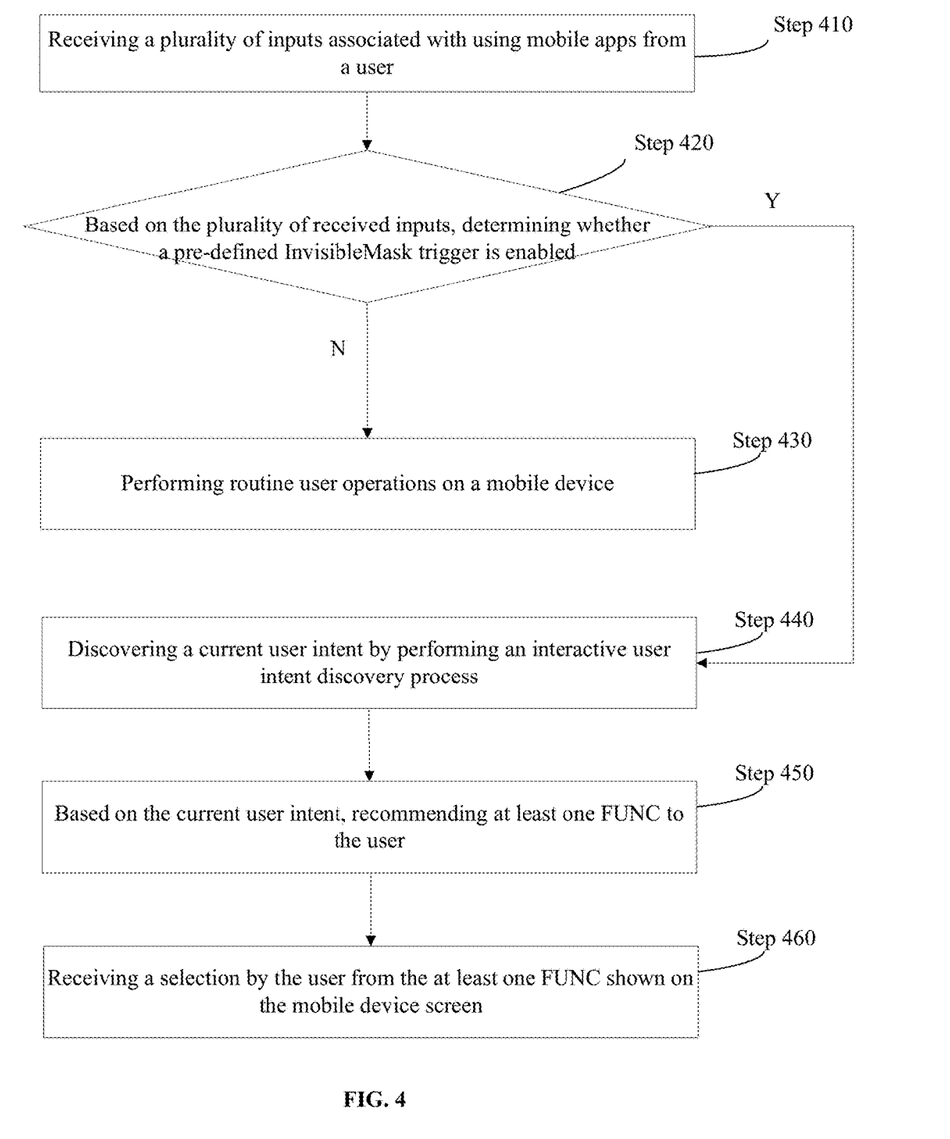
FIG. 4 illustrates a flow chart of an exemplary inter-app switching process consistent with the disclosed embodiments.

Thus, in operation, based on the plurality of user inputs, the system may determine whether a pre-defined InvisibleMask trigger is enabled. Once the pre-defined InvisibleMask trigger is turned on, the current user intent is discovered and a plurality of visible objects are shown on a mobile device screen to be accessible for user selection, leading the user into an opened app page for meeting the current user intent. FIG. 4 illustrates a flow chart of an exemplary inter-app switching process consistent with the disclosed embodiments.

As shown in FIG. 4, the inter-app switching process may include the following steps. At the beginning, a plurality of inputs associated with mobile app usage are received from a user (Step 410). The plurality of inputs may be touch-screen gestures, operations for pressing buttons (or clicking app icons), and operations for inputting characters in a mobile app search bar.

Based on the plurality of received inputs, whether a pre-defined InvisibleMask trigger is enabled is determined (Step 420). The InvisibleMask is a tangible mechanism to bring all visible objects on a mobile device screen to be accessible for user selection. The visible objects may be an image, a block of text, a phone number, or an icon representing human identity or other specific meanings for further processing.

When the pre-defined InvisibleMask trigger is disabled (Step 420, no), routine user operations are performed on the mobile device (Step 430). The routine user operations may include performing certain operations for the selected mobile apps (e.g., opening mobile apps, installing mobile apps, removing mobile apps, etc.).

Figure 5:
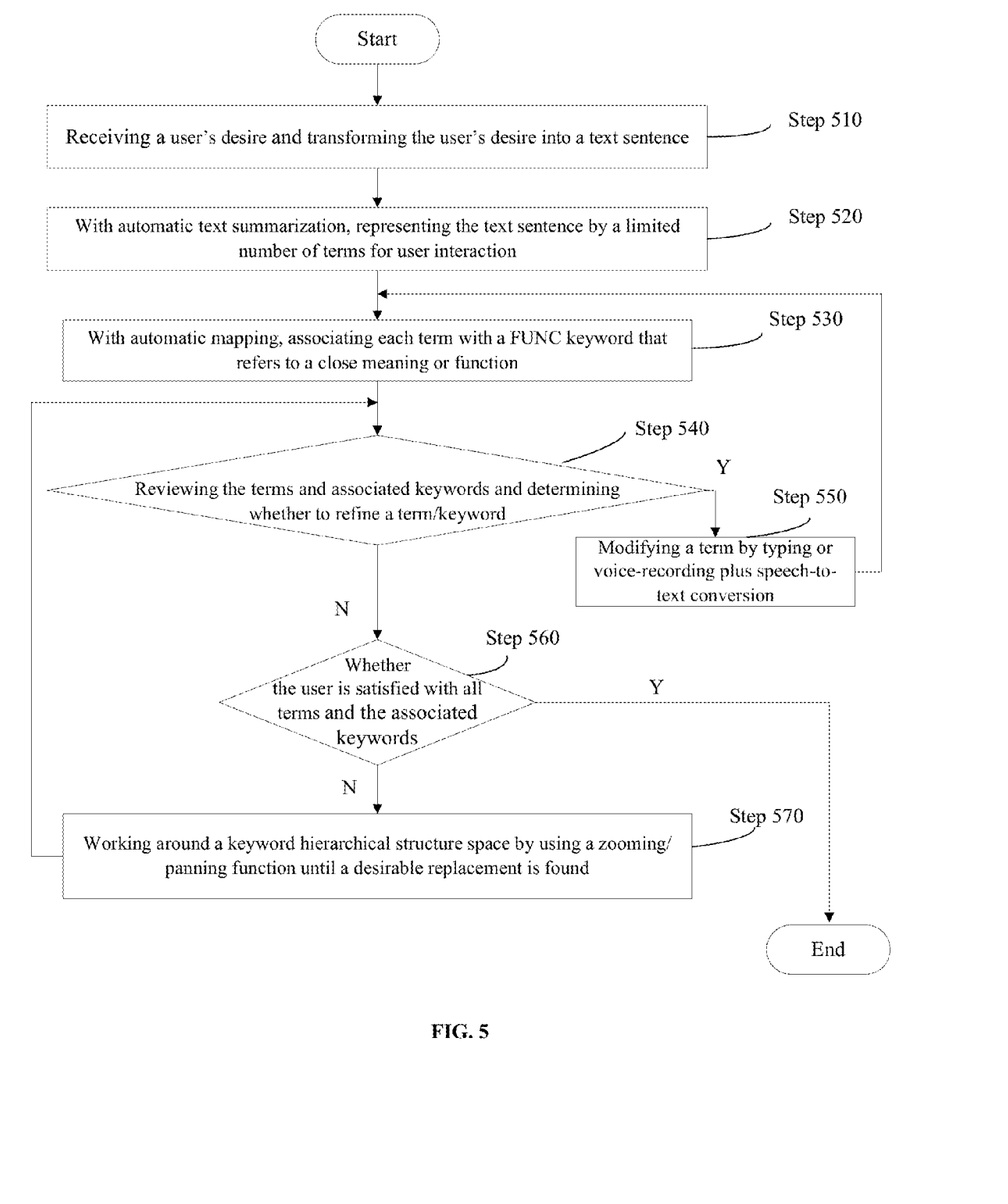
FIG. 5 illustrates a flow chart of an exemplary interactive user intent discovery process consistent with the disclosed embodiments.

When the pre-defined InvisibleMask trigger is enabled (Step 420, yes), a current user intent is discovered by performing an interactive user intent discovery process (Step 440). In the interactive user intent discovery process, the user's current intent may be discovered by utilizing user's interactions to refine representation of his/her intent and map the user intent to potential FUNCs available. FIG. 5 illustrates a flow chart of an exemplary interactive user intent discovery process consistent with the disclosed embodiments.

As shown in FIG. 5, the interactive user intent discovery process may include the following steps. At the beginning, the system receives a user's desire, and transforms the user's desire into a text sentence (Step 510). The user's desire may be expressed directly by the user via voice, text or other inputting methods in the mobile device. For example, a user's input (e.g., typing "hungry") needs to be mapped into a concrete desire (e.g., "find a restaurant"), and then the concrete desire may be transformed into a text sentence "Find a restaurant for me near my location".

With automatic text summarization, the text sentence is represented by a limited number of terms for a user interaction (Step 520). For example, a sentence "Find a restaurant of Italia Pizza for me" can be represented by "Restaurant"+"Italia Pizza".

With automatic mapping, each term is associated with a FUNC keyword that refers to a close meaning or function (Step 530). Typically, a FUNC can be labeled as a vector $<X_i>$, where $X_i$ belongs to an infinite list like $\{0, 1, \ldots, G\}$ when representing a business/toolkit category type, such as travel, finance, social type function.

The user reviews the terms and associated keywords to determine whether to refine a term/keyword (Step 540). After the automatic mapping is performed, the user needs to identify a corresponding relationship between each term and a FUNC keyword by reviewing the terms and the associated keywords. If the user finds that the term/keyword does not accurately represent his/her intent, the user may determine to refine a term/keyword.

When the user determines to refine a term/keyword, the user can modify a term by typing or voice-recording plus speech-to-text conversion (Step 550). Then, the interactive user intent discovery process goes back to Step 530. For example, a user may speak a term/keyword that needs to be modified using a voice input method and convert the spoken term/keyword to text.

Whether the user is satisfied with all terms and the associated keywords is determined (Step 560). When the user is satisfied with all terms and the associated keywords, the interactive user intent discovery process is ended. When the user is not satisfied with the FUNC keyword associated with a term, the user can work around a keyword hierarchical structure space by using a zooming/panning function until a desirable replacement is found for the FUNC keyword (Step 570).

That is, when the user wants to see more recommendation FUNC keywords associated with the term in a specific area, the user may use a specific touch-screen gesture or press a button in a motion-sensor based remote control to zoom in, then the next lower level of pyramid with FUNC keywords is rendered with the same pivot center point. Thus, the user may be able to view more relevant FUNC keywords around the local zoom-in point.

Similarly, the zoom-out operation triggers to render the upper level of FUNC keywords in the pyramid. When the recommendation level goes to level 0 (i.e., a top level), only the most representative recommendations may be rendered, which may have a large-range of diversity. The top level may also be displayed by a single icon as the abstract of the lower level recommendation contents or as an indication for the zoomable recommendation operation. For example, if "Italian Pizza" is not food or Pizza that a user wants, the user can find more information in the neighborhood and see whether "Chicago Pizza" is his/her choice, or zoom out to a level above "Pizza" or even a level to "Food", then zoom in to find desirable food or Pizza in the lower level than the level "Pizza" or "Food". Then, the interactive user intent discovery process goes back to Step 540. The interactive user intent discovery process is ended until the user is satisfied with all terms and the associated keywords.

Figure 6:
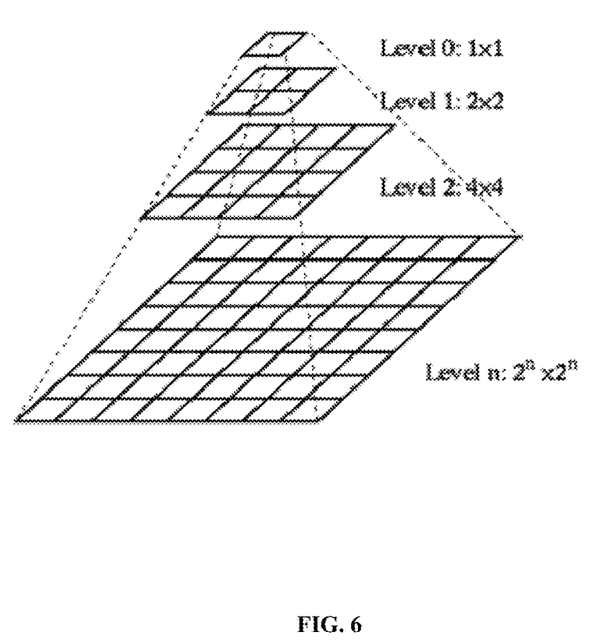
FIG. 6 illustrates an exemplary pyramid hierarchical data structure consistent with the disclosed embodiments.

It should be noted that a pre-processing step of building a hierarchical structure for the app or FUNC keywords is required. In other words, all the keywords related to the FUNCs are organized into the hierarchical structure so that the same zoomable operation can be conducted in this domain. That is, finding a keyword in the structure is just like looking for a street in a map by zooming and panning the map. FIG. 6 illustrates an exemplary pyramid hierarchical data structure consistent with the disclosed embodiments.

As shown in FIG. 6, the selected contents, e.g., all the FUNC keywords that are ready for recommendation, are mapped onto a pyramid-like hierarchical data structure. The pyramid data structure may include a plurality of levels (i.e., zoomable recommendation levels), from level 0 (the top level or the highest level) to level n (the bottom level or the lowest level), and n is the total number of zoomable recommendation levels. Further, an upper level of the pyramid may be an abstraction of its associated lower levels.

More specifically, the recommendation level 0 may include one content area (1×1), level 1 may include four content areas (2×2), level 2 may include 16 content areas (4×4), and level n may include 22n content areas (2n×2n). Each content area may be represented by one or more FUNC keywords allocated into the content area. Further, the lowest recommendation level (i.e., level n) may display all the selected contents without abstraction. Thus, the total number N of the selected recommendation FUNC keywords may be 22n. A larger total number may be used with a certain number of abstractions and any appropriate total number may be used.

An initial recommendation level around the middle of the total recommendation levels may be set, such that the user may start by accessing a mid-level of pyramid with allocated FUNC keywords. In certain embodiments, the initial recommendation level may also be set as the first level (i.e., level 0) or the initial recommendation level may be set as configured by the user.

After the recommendation is made to the user at the initial recommendation level, the user may change the recommendation level, i.e., a zoom in/out operation, using any appropriate input device. Further, the user may also change the viewing content. The selected candidate pool may be updated according to the changes made by the user. If no update is made, the selected candidate pool is unchanged; otherwise, the selected candidate pool is changed.

The selected contents may be connected or related with each other in various ways, i.e., in an M-dimension space. However, the mapped contents may be limited to a limited number of dimensions, such as a 2D-dimension space.

Returning to FIG. 4, after the current user intent is discovered, based on the current user intent, at least one FUNC is recommended to the user (Step 450). The at least one FUNC includes at least one app different from the app currently used by the user.

The mobile device receives a selection by the user from the at least one FUNC shown on the mobile device screen (Step 460), thus directly switching from a current app page to another app page for meeting the current user intent without returning to any home screen on the mobile device.

For example, a user browses images stored in his/her Apple IPhone, and the user wants to upload an image to iCloud Photo Library. The system receives the user's desire, and transforms the user's desire into a text sentence "upload an image to iCloud from Apple IPhone". Then, the text sentence (i.e., "upload an image to iCloud from Apple IPhone") is represented by terms "image"+"Cloud"+"IPhone" for user interactions. After automatic mapping is done, each term is associated with a FUNC keyword.

That is, the terms "image", "Cloud", and "IPhone" are associated with FUNC keywords "file", "weather", and "phone", respectively. The user reviews the terms (i.e., "image", "Cloud", and "IPhone") and the associated keywords (i.e., "file", "weather", and "phone") to determine whether to refine a term/keyword. The user can modify the term "Cloud" to "iCloud" by typing "iCloud". Then, the user finds that the term "iCloud" should not be associated with the FUNC keyword "weather".

Further, the user can work around a keyword hierarchical structure space by using a zooming/panning function until finding a FUNC keyword "storage" for the term "iCloud". Thus, the term "iCloud" is associated with the FUNC keyword "storage". After the current user intent is discovered, the mobile device receives a selection by the user from the recommended FUNCs shown on the mobile device screen, switching directly from a current app page (i.e., image processing app) to another app page (i.e., iCloud app) without returning to any home screen on the mobile device.

By using the disclosed methods and systems, the user's dynamic intent can be understood. The disclosed inter-app switching methods and systems bring personalized multi-functional choices to a user according to a clickable object that he/she is operating on, which may enable the user quickly access another function in another app in a very efficient manner. The scenario information, such us the current time, location as well as the user's preferences, have been intensively considered to make the user intent discovery more effective.

It is understood that the disclosed methods and systems are also not limited to usage scenario for the mobile apps. The disclosed methods may fit into any networked device group in a network to enable negotiation between the user and the system to progressively approach the desired intent, effectively reducing the impact of annoying inaccurate recommendations for the user. For example, the disclosed systems may be integrated in smart phones to help organize and share information valuable to assist in reserving a restaurant, researching a doctor, choosing movies, choosing services and shops, renting DVDs, buying books, etc.

Although the method is disclosed for illustrative purposes, similar concept and approach can be applied to all scenarios that have multiple connected devices involved. Other applications, advantages, alternations, modifications, or equivalents to the disclosed embodiments are obvious to those skilled in the art.

What is claimed is:

1. An inter-app switching method on a mobile device, comprising:
    receiving at least one input associated with mobile application (app) usage from a user;
    based on the at least one received input, determining whether a pre-defined trigger is enabled;
    when the pre-defined trigger is disabled, performing routine user operations on the mobile device; and
    when the pre-defined trigger is enabled, performing the following operations:
        discovering a current user intent by utilizing at least one user interaction;
        obtaining a user preference represented by a mixture of K Gaussian distribution, wherein K represents a total number of categories related to a current mobile app;
        based on the current user intent and the user preference, recommending at least one mobile app recommendation and access point (FUNC) to the user, wherein each FUNC includes at least an entrance to a function and a type of the function;
        receiving a selection by the user from the at least one recommended FUNC; and
        directly switching from a current app page to another app page without returning to any home screen on the mobile device.

2. An inter-app switching method on a mobile device, comprising:
receiving at least one input associated with mobile application (app) usage from a user;
based on the at least one received input, determining whether a pre-defined trigger is enabled;
when the pre-defined trigger is disabled, performing routine user operations on the mobile device; and
when the pre-defined trigger is enabled, performing the following operations:
discovering a current user intent by utilizing at least one user interaction, including:
receiving the user's interest directly via voice, text and any other inputting method in the mobile device;
transforming the user's interest into a text sentence;
representing the text sentence by a limited number of terms for each of the at least one user interaction by performing automatic text summarization;
mapping automatically the limited number of terms into keywords that represent close meanings and functions;
determining whether to refine at least one term and the associated keyword by reviewing the term and the associated keyword;
when the user determines to refine the at least one term and the associated keyword, modifying the at least one term; and
when the user is not satisfied with the keyword associated with the term, performing zoomable operations among a keyword hierarchical structure space until a desirable replacement for the keyword is found;
based on the current user intent, recommending at least one mobile app recommendation and access point (FUNC) to the user, wherein each FUNC includes at least an entrance to a function and a type of the function;
receiving a selection by the user from the at least one recommended FUNC; and
directly switching from a current app page to another app page without returning to any home screen on the mobile device.

3. The method according to claim 2, further including:
detecting and dynamically updating scenario-based knowledge for a current scenario;
converting an input text to a combination of key words and key objects to reflect the user current intent;
combining the user current intent with the scenario-based knowledge to obtain refined knowledge; and
based on the refined knowledge, determining the at least one FUNC, wherein the at least one FUNC includes at least one app different from a current app.

4. The method according to claim 3, wherein:
the scenario-based knowledge includes time, location, events, and user preferences.

5. The method according to claim 4, wherein:
provided that the user preference is represented using a mixture of K Gaussian distributions, a probability that the user prefers $X_t$ at time t is estimated as:

$$P(X_t) = \sum_{i=1}^{K} w_{i,t} \frac{1}{\sqrt{2\pi}\,\sigma_i} e^{-\frac{1}{2}(X_t - \mu_{i,t})^T \Sigma^{-1}(X_t - \mu_{i,t})}$$

wherein t represents time information; K represents a total number of categories related to the current mobile app; $w_{i,t}$ is a normalized weight; and $\mu_i$ and $\sigma_i$ are a mean and a standard deviation of an i-th distribution, respectively.

6. The method according to claim 3, wherein recommending at least one FUNC to the user further includes:
based on the obtained refined knowledge, making an initial FUNC recommendation on the mobile device to the user; and
based on the obtained refined knowledge, predicting a next-step FUNC on the mobile device to the user.

7. The method according to claim 2, further including:
when the pre-defined trigger is enabled, bringing a plurality of visible objects on a mobile device screen to be accessible for user selection, wherein each of the plurality of visible objects is one of an image, a block of text, a phone number, and an icon representing human identity and other specific meanings.

8. An inter-app switching system, comprising:
a user interaction handler configured to receive at least one input associated with mobile application (app) usage from a user and determine whether a pre-defined trigger is enabled based on the at least one received input;
the pre-defined trigger configured to bring a plurality of visible objects on a mobile device screen to be accessible for user selection when the pre-defined trigger is enabled, wherein the pre-defined trigger is one of a specific gesture on the mobile device that is not normally used by mobile apps and a specific button that is added to the mobile device;
a routine operation handling module configured to, when the pre-defined trigger is disabled, perform routine user operations on the mobile device; and
an interactive user intent discovery module configured to, when the pre-defined trigger is enabled, discover a current user intent by utilizing at least one user interaction and receive a selection by the user from the plurality of visible objects shown on the mobile device screen;
wherein the interactive user intent discovery module further includes:
a visible object selection module configured to enable the user to select one visible object from the plurality of visible objects, and convert the selected visible object to a representative text as the user's current intent for further processing;
a user desire analyzer configured to monitor the user's interactions and detect the user's mood to evaluate the degree of the user interest;
a user desire receiver configured to receive the user's interest directly via voice, text, and any other inputting method in the mobile device, and transform content of the received interest into a text format;
a scenario discovery engine configured to detect and update dynamically scenario-based knowledge for a current scenario;
an interactive intent understanding module configured to convert an input text to a combination of key words and key objects that are understandable to the system to reflect the user current intent;
a scenario-based intent discovery configured to combine the user's intent with the scenario-based knowledge to obtain refined knowledge; and
a FUNC mapping module configured to, based on the obtained refined knowledge, determine at least one mobile app recommendation and access point (FUNC) and recommend the at least one FUNC to the user, wherein the at least one FUNC includes at least one app different from a current app, each FUNC includes at least an entrance to a function and a type of the function.

9. The system according to claim 8, wherein:
the scenario-based knowledge includes time, location, events, and user preferences.

10. The system according to claim 9, wherein:
provided that the user preference is represented using a mixture of K Gaussian distributions, a probability that the user prefers $X_t$ at time t is estimated as:

$$P(X_t) = \sum_{i=1}^{K} w_{i,t} \frac{1}{\sqrt{2\pi}\,\sigma_i} e^{-\frac{1}{2}(X_t - \mu_{i,t})^T \sum^{-1}(X_t - \mu_{i,t})}$$

wherein t represents time information; K represents a total number of categories related to the current mobile app; $w_{i,t}$ is a normalized weight; and $\mu_i$ and $\sigma_i$ are a mean and a standard deviation of an i-th distribution, respectively.

11. The system according to claim 8, wherein the FUNC mapping module is further configured to:
based on the obtained refined knowledge, make an initial FUNC recommendation on the mobile device to the user; and
based on the obtained refined knowledge, predict a next-step FDNC on the mobile device to the user.

12. The system according to claim 8, wherein:
each of the plurality of visible objects is one of an image, a block of text, a phone number, and an icon representing human identity and other specific meanings for further processing.

* * * * *